(No Model.)
J. LONG.
FIFTH WHEEL ANTI RATTLER.
No. 336,927. Patented Mar. 2, 1886.
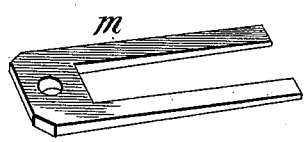
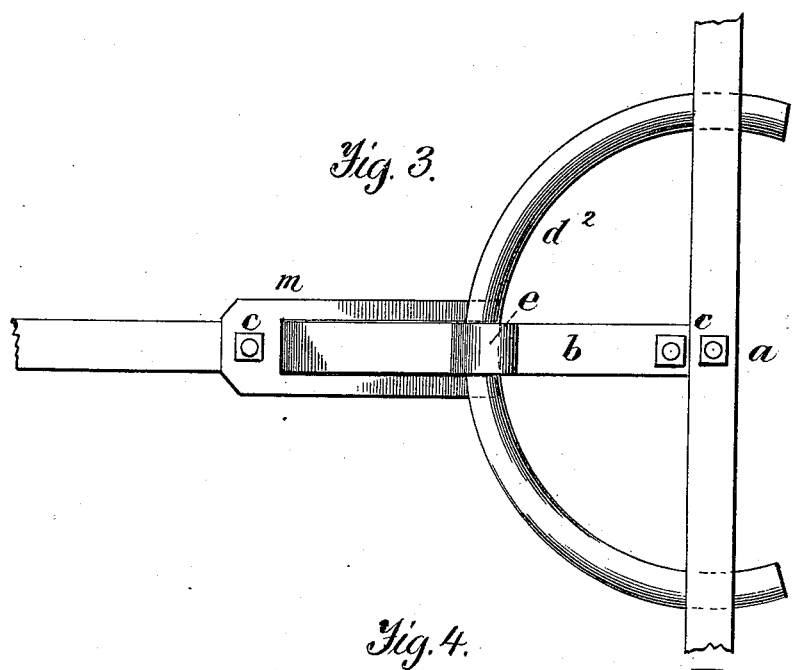
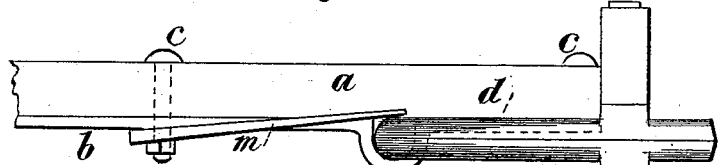
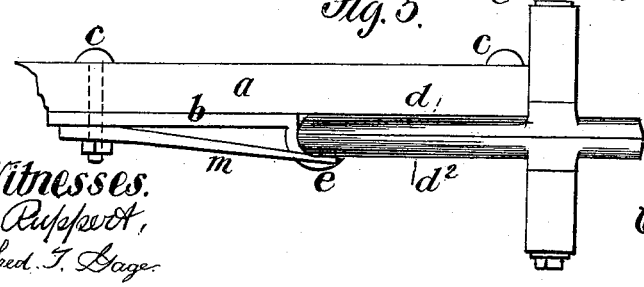
Witnesses.
A. Ruppert,
Alfred T. Gage.
Inventor.
John Long
by
Chas M. Nye
his Atty.

UNITED STATES PATENT OFFICE.

JOHN LONG, OF BRIGHTON, IOWA.

FIFTH-WHEEL ANTI-RATTLER.

SPECIFICATION forming part of Letters Patent No. 336,927, dated March 2, 1886.

Application filed August 20, 1885. Serial No. 174,875. (No model.)

*To all whom it may concern:*

Be it known that I, JOHN LONG, a citizen of the United States, residing in Brighton, in the county of Washington, in the State of Iowa, have invented an Anti-Rattler for Fifth-Wheels of Carriages, of which the following specification is sufficient in law.

My invention is a bifurcated spring-plate, and it is so attached to the reach that it will press together the upper and lower parts forming the fifth-wheel, and thereby prevent the rattling of the parts. The spring may be of the shape shown in Figure 1, or it may be curved, as shown in Fig. 2.

In the drawings, Figure 1 shows a straight bifurcated spring-plate; Fig. 2, a curved bifurcated spring-plate; Figs. 3, 4, and 5, the invention as applied to the fifth-wheel.

The several parts are designated as follows: $a$, wooden part of the reach; $b$, iron part of the reach; $c$, bolts and nuts to join them together; $d$ $d^2$, upper and lower parts of the fifth-wheel; $e$, loop or guide for fifth-wheel; $m$, straight bifurcated spring-plate or anti-rattling device; $n$, curved bifurcated spring-plate.

The spring-plate is made thickest at the point of attachment. The leaves of the plate diminish in thickness to their outer ends. The distance between the leaves is a trifle more than the width of the reach. When attached to the reach the iron portion of the reach is between the leaves. This prevents any twisting of the leaves. Either straight or curved plate is attached to the reach by one of the bolts used to secure together the iron and wooden parts of the reach. No extra bolt is needed to make the attachment.

These anti-rattlers may be attached to the reach either above or below it, and they may be set within or without the fifth-wheel.

I claim—

An anti-rattler for fifth-wheels of carriages, consisting of either a straight or curved bifurcated spring-plate, which when attached to the reach will press together the upper and lower portions of the fifth-wheel, substantially as shown and described.

JOHN LONG.

Witnesses:
    A. S. FOLGER,
    JARED A. LONG.